(12) United States Patent
Kobayashi

(10) Patent No.: US 9,833,985 B2
(45) Date of Patent: Dec. 5, 2017

(54) THREE-DIMENSIONAL PRINTING SYSTEM

(71) Applicant: Roland DG Corporation, Hamamatsu-shi, Shizuoka (JP)

(72) Inventor: Kouichi Kobayashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 75 days.

(21) Appl. No.: 14/621,584

(22) Filed: Feb. 13, 2015

(65) Prior Publication Data
US 2015/0231824 A1 Aug. 20, 2015

(30) Foreign Application Priority Data
Feb. 19, 2014 (JP) .................................. 2014-029233

(51) Int. Cl.
| | | |
|---|---|---|
| *B33Y 10/00* | (2015.01) | |
| *B29C 70/54* | (2006.01) | |
| *B29C 64/135* | (2017.01) | |
| *B29L 9/00* | (2006.01) | |

(52) U.S. Cl.
CPC ............ *B33Y 10/00* (2014.12); *B29C 64/135* (2017.08); *B29C 70/545* (2013.01); *B29L 2009/00* (2013.01)

(58) Field of Classification Search
None
See application file for complete search history.

(56) References Cited

U.S. PATENT DOCUMENTS

| | | | | |
|---|---|---|---|---|
| 5,089,184 A | * | 2/1992 | Hirano et al. ................ | 264/401 |
| 5,174,931 A | * | 12/1992 | Almquist et al. ............ | 264/401 |
| 2002/0155189 A1 | | 10/2002 | John | |

FOREIGN PATENT DOCUMENTS

JP          2003-039564 A          2/2003

* cited by examiner

*Primary Examiner* — Jacob Thomas Minskey
(74) *Attorney, Agent, or Firm* — Keating & Bennett, LLP

(57) ABSTRACT

A three-dimensional printing system calculates a resin amount required to print a three-dimensional object by curing a liquid photo-curable resin and sequentially stacking layers of the cured resin each having a predetermined cross-sectional shape. The system includes a first storage section configured to store information of a three-dimensional object, and information of an auxiliary member that supports the three-dimensional object, a first calculation section configured to calculate a resin amount necessary to print the three-dimensional object and a resin amount necessary to print the auxiliary member based on the information of the three-dimensional object and the auxiliary member stored in the first storage section, an output section configured to output a first resin amount that is the sum of the calculated resin amounts necessary to print the three-dimensional object and the auxiliary member, and a three-dimensional printing apparatus.

12 Claims, 7 Drawing Sheets

THREE-DIMENSIONAL PRINTING SYSTEM

This application claims priority to Patent Application No. 2014-29233 filed in Japan on Feb. 19, 2014, the entire contents of which are hereby incorporated by reference.

BACKGROUND OF THE INVENTION

1. Field of the Invention

The present invention relates to three-dimensional printing systems.

2. Description of the Related Art

A three-dimensional printing apparatus known in the art exposes a liquid photo-curable resin stored in a tank to light so as to cure the photo-curable resin, thus printing a three-dimensional object.

A three-dimensional printing apparatus of this type includes a base provided with an opening, a tank placed on the base, and a raisable and lowerable holder disposed over the tank. An optical system is disposed under the tank. For example, the optical system includes a light source that emits light and a mirror. A portion of a photo-curable resin stored in the tank is exposed to the light emitted from the light source, and this portion of the photo-curable resin is cured. By controlling a position at which the resin is to be exposed to the light, a position at which the resin is to be cured changes to a suitable position, and the cured resin can thus form a desired cross-sectional shape. Such desired cross-sectional shapes are continuously formed downward by sequentially raising the holder. As a result, a desired three-dimensional object is printed.

A deficiency of a resin in the tank in printing a three-dimensional object makes it impossible to complete or finish printing a desirable three-dimensional object. To avoid such a situation, a photo-curable resin is abundantly stored in the tank in advance in the three-dimensional printing apparatus known in the art. This may cause a large amount of the resin to remain in the tank after printing of a three-dimensional object has been completed (i.e., after the printing of the three dimensional object is completely finished). The remaining resin is used again to print a next three-dimensional object. Unfortunately, a portion of this remaining resin may have been exposed to the light from the light source during printing of the previous three-dimensional object, thus degrading the photo-curable resin. The use of the degraded photo-curable resin in the next printing of a three-dimensional object fails to form a desirable cross-sectional shape, resulting in a low quality three-dimensional object.

SUMMARY OF THE INVENTION

Accordingly, preferred embodiments of the present invention significantly reduce frequency of exposure of a photo-curable resin, thus preventing degradation in the photo-curable resin, and printing a high quality three-dimensional object.

A non-transitory computer-readable storage medium according to a preferred embodiment of the present invention stores a computer program intended for a three-dimensional printing apparatus and used to calculate a resin amount necessary to print a three-dimensional object by curing a liquid photo-curable resin and sequentially stacking layers of the cured resin each having a predetermined cross-sectional shape, the computer program causing a computer to function as: a first storage section configured to store information of a three-dimensional object to be printed, and information of an auxiliary member that supports the three-dimensional object; a first calculation section configured to calculate a resin amount necessary to print the three-dimensional object and a resin amount necessary to print the auxiliary member, the first calculation section being configured to calculate the resin amounts based on the information of the three-dimensional object and the auxiliary member stored in the first storage section; and an output section configured to output a first resin amount that is a sum of the calculated resin amount necessary to print the three-dimensional object and the calculated resin amount necessary to print the auxiliary member.

According to this preferred embodiment, the first calculation section calculates the resin amount necessary to print the three-dimensional object and the resin amount necessary to print the auxiliary member. Then, the output section outputs the first resin amount that is the sum of the calculated resin amount necessary to print the three-dimensional object and the calculated resin amount necessary to print the auxiliary member. Thus, before printing of the three-dimensional object is started, a user can know in advance the resin amount necessary to print the three-dimensional object. This allows the user to use only the amount of resin that is necessary to print the three-dimensional object, thus preventing an undesirable excess or additional amount of resin from remaining in the tank after the printing of the three-dimensional object has been completed or finished. An amount of the resin remaining in the tank after the process for printing the three-dimensional object has been completed or finished that is undesirably large may cause degradation of the resin which will likely cause problems when subsequent printing of additional three-dimensional objects is performed. However, according to the present preferred embodiment of the present invention, the photo-curable resin is always maintained in good condition is thus available to be used to perform printing of three-dimensional objects without errors caused by the resin condition, thus preventing a reduction in quality of the resulting three-dimensional object or objects.

According to another preferred embodiment of the present invention, the first calculation section is preferably configured to divide the three-dimensional object and the auxiliary member, which are to be printed, into a plurality of segments arranged in a direction in which the layers of the cured resin are to be stacked, calculate a resin amount necessary for each of the segments by using Simpson's rule, and add up the calculated resin amounts necessary for the segments, thus obtaining the first resin amount.

According to this preferred embodiment, the first resin amount is obtained accurately in a short period of time.

According to still another preferred embodiment of the present invention, the computer program preferably further causes the computer to function as a second storage section configured to store information of a tank that stores the photo-curable resin, and information of a base on which the tank is placed, the base including a light passage portion through which light to be applied to the photo-curable resin passes; and a second calculation section configured to calculate a second resin amount that is a resin amount remaining in the tank after printing of the three-dimensional object has been finished, the second calculation section being configured to calculate the second resin amount based on the information of the tank and the base stored in the second storage section. The output section is preferably configured to output a third resin amount that is a sum of the first and second resin amounts.

According to this preferred embodiment, the second calculation section is configured to calculate the second resin amount that is the amount of the resin remaining in the tank after printing of the three-dimensional object has been finished. Then, the output section outputs the third resin amount that is the sum of the first and second resin amounts. Consequently, the user uses the resin by the third resin amount to print the three-dimensional object, thus preventing a situation in which no photo-curable resin remains over the light passage portion during printing of the three-dimensional object. In other words, the user can know the necessary amount of the photo-curable resin in advance, and uses only the necessary amount of the photo-curable resin to print the three-dimensional object, thus preventing an amount of the resin from remaining in the tank after printing of the three-dimensional object has been finished from being undesirably large.

According to yet another preferred embodiment of the present invention, the second resin amount preferably is a resin amount remaining in the tank and necessary to entirely cover the light passage portion.

According to this preferred embodiment, the second calculation section is configured to calculate the amount of the resin necessary to entirely cover the light passage portion after printing of the three-dimensional object has been finished. This allows the user to know the minimum necessary amount of the photo-curable resin in advance and to use only the minimum necessary amount of the photo-curable resin to print the three-dimensional object, thus preventing an amount of the resin remaining in the tank after printing of the three-dimensional object has been finished from being undesirably large.

A three-dimensional printing system according to a further preferred embodiment of the present invention prints a three-dimensional object by curing a liquid photo-curable resin and sequentially stacking layers of the cured resin each having a predetermined cross-sectional shape, the system including a first storage section configured to store information of a three-dimensional object to be printed, and information of an auxiliary member that supports the three-dimensional object; a first calculation section configured to calculate a resin amount necessary to print the three-dimensional object and a resin amount necessary to print the auxiliary member, the first calculation section being configured to calculate the resin amounts based on the information of the three-dimensional object and the auxiliary member stored in the first storage section; an output section configured to output a first resin amount that is a sum of the calculated resin amount necessary to print the three-dimensional object and the calculated resin amount necessary to print the auxiliary member; and a three-dimensional printing apparatus. The three-dimensional printing apparatus includes a tank that stores the liquid photo-curable resin; a base on which the tank is located, the base including a light passage portion through which light to be applied to the photo-curable resin passes; an optical device disposed under the base and including at least a light source that emits light, the optical device being configured to apply the light, emitted from the light source, to the photo-curable resin in the tank through the light passage portion; and a holder provided over the tank so as to be raisable and lowerable, the holder being configured so that when lowered, the holder is immersed in the photo-curable resin in the tank, and when raised, the holder lifts the photo-curable resin cured by exposure to the light.

According to this preferred embodiment, the first calculation section is configured to calculate the resin amount necessary to print the three-dimensional object and the resin amount necessary to print the auxiliary member. Then, the output section outputs the first resin amount that is the sum of the calculated resin amount necessary to print the three-dimensional object and the calculated resin amount necessary to print the auxiliary member. Thus, before printing of a three-dimensional object has been started, the user can know in advance the resin amount necessary to print the three-dimensional object. This allows the user to store, in the tank, the amount of the resin necessary to print the three-dimensional object, thus preventing too much of the resin from undesirably remaining in the tank after printing by the three-dimensional printing apparatus of the three-dimensional object has been finished. An undesirably large amount of the resin remaining in the tank after printing of the three-dimensional object has been finished may cause degradation of the resin and resulting problems when the many three-dimensional objects are continuously or repeatedly printed using this remaining resin. However, according to the present preferred embodiment of the present invention, the photo-curable resin that is always ready for printing in good condition is stored in the tank to print the three-dimensional object, thus preventing a reduction in quality of the resulting three-dimensional object.

According to another preferred embodiment of the present invention, the first calculation section is preferably configured to divide the three-dimensional object and the auxiliary member, which are to be printed, into a plurality of segments arranged in a direction in which the layers of the cured resin are to be stacked, calculate a resin amount necessary for each of the segments by using Simpson's rule, and add up the calculated resin amounts necessary for the segments, thus obtaining the first resin amount.

According to this preferred embodiment, the first resin amount is obtained accurately in a short period of time.

According to still another preferred embodiment of the present invention, the system preferably further includes a second storage section configured to store information of the tank and the base; and a second calculation section configured to calculate a second resin amount that is a resin amount remaining in the tank after printing of the three-dimensional object has been finished, the second calculation section being configured to calculate the second resin amount based on the information of the tank and the base stored in the second storage section. The output section is preferably configured to output a third resin amount that is a sum of the first and second resin amounts.

According to this preferred embodiment, the second calculation section is configured to calculate the second resin amount that is the amount of the resin remaining in the tank after printing of the three-dimensional object has been finished. Then, the output section outputs the third resin amount that is the sum of the first and second resin amounts. Consequently, the user stores the resin in the tank by the third resin amount when printing the three-dimensional object, thus preventing a situation in which no photo-curable resin remains over the light passage portion during printing of the three-dimensional object. In other words, the user can know the necessary amount of the photo-curable resin in advance, and uses the necessary amount of the photo-curable resin to print the three-dimensional object, thus preventing an amount of the resin from remaining in the tank after printing of the three-dimensional object has been finished from being undesirably large.

According to yet another preferred embodiment of the present invention, the second resin amount preferably is a resin amount remaining in the tank and necessary to entirely cover the light passage portion.

According to this preferred embodiment, the second calculation section is configured to calculate the amount of the resin necessary to entirely cover the light passage portion after printing of the three-dimensional object has been finished. This allows the user to know the minimum necessary amount of the photo-curable resin in advance and to use the minimum necessary amount of the photo-curable resin required to print the three-dimensional object, thus preventing an amount of the resin remaining in the tank after printing of the three-dimensional object has been finished from being undesirably large.

According to still yet another preferred embodiment of the present invention, assuming that a predetermined direction of the tank is defined as a front-rear direction, the light passage portion is preferably located under a bottom surface of a rear portion of the tank, and a front end of the tank is preferably located upward relative to a rear end of the tank.

According to this preferred embodiment, the tank tilts so that the photo-curable resin accumulates at the rear end of the tank. This reduces the amount of the resin necessary to entirely cover the light passage portion of the base after printing of the three-dimensional object has been finished.

According to another preferred embodiment of the present invention, the second resin amount preferably is an amount of the photo-curable resin that remains on a portion of the bottom surface of the tank located over the light passage portion but does not remain on the other portion of the bottom surface of the tank after printing of the three-dimensional object has been finished.

This preferred embodiment further reduces the amount of the resin necessary to entirely cover the light passage portion of the base after printing of the three-dimensional object has been finished.

According to still another preferred embodiment of the present invention, the system preferably further includes a display device configured to display the first resin amount or the third resin amount output from the output section.

This preferred embodiment allows the user to visually perceive the first resin amount or the third resin amount.

According to yet another preferred embodiment of the present invention, the system preferably further includes a supply device configured to supply the liquid photo-curable resin to the tank. The supply device is preferably automatically configured to supply the photo-curable resin to the tank by the first resin amount or the third resin amount.

This preferred embodiment prevents the user from supplying an erroneous amount of the photo-curable resin.

According to still yet another preferred embodiment of the present invention, the system preferably further includes a measuring device configured to measure an amount of the resin in the tank; and a determination section configured to determine whether the amount of the resin in the tank, measured by the measuring device, is a predetermined amount, wherein upon determination by the determination section that the amount of the resin in the tank is greater than the predetermined amount after printing of the three-dimensional object has been finished, the supply device reduces the amount of the photo-curable resin to be supplied to the tank.

According to this preferred embodiment, the supply device reduces the amount of the photo-curable resin to be supplied to the tank when the amount of the resin in the tank is greater than the predetermined amount after printing of the three-dimensional object has been finished. This prevents an amount of the resin remaining in the tank after printing of the next three-dimensional object has been finished from being undesirably large.

Various preferred embodiments of the present invention significantly reduce the frequency of exposure of a photo-curable resin to ultraviolet radiation, thus preventing degradation in the photo-curable resin, and printing a high quality three-dimensional object.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
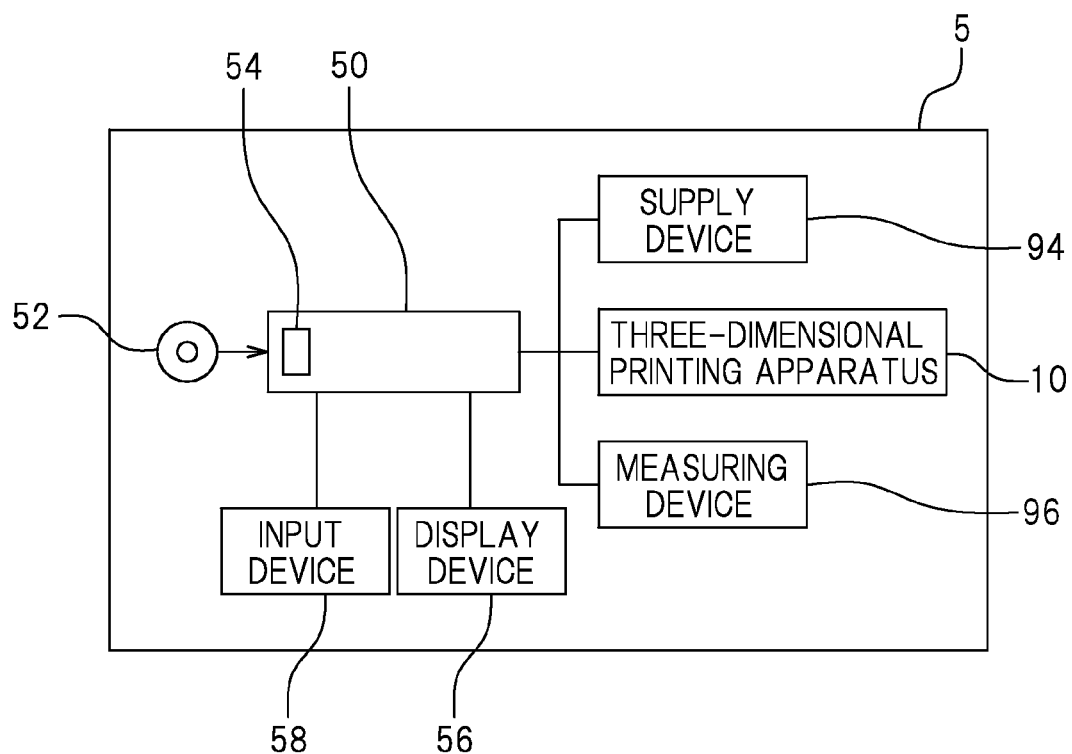
FIG. 1 is a block diagram of a three-dimensional printing system according to a preferred embodiment of the present invention.

Hereinafter, preferred embodiments of the present invention will be described with reference to the drawings. The following preferred embodiments will be described on the assumption that a three-dimensional object is printed using a computer program, for example. A three-dimensional printing system 5 according to a present preferred embodiment cures a liquid photo-curable resin and sequentially stacks layers of the cured resin each having a predetermined cross-sectional shape, thus printing a three-dimensional object. The three-dimensional printing system 5 preferably uses the computer program according to the present preferred embodiment. As illustrated in FIG. 1, the three-dimensional printing system 5 preferably includes a three-dimensional printing apparatus 10, a computer 50, a supply device 94, and a measuring device 96, for example. The three-dimensional printing apparatus 10 prints a three-dimensional object.

Unless otherwise noted, left, right, upper and lower portions of FIG. 2 correspond to front, rear, upper and lower portions of the three-dimensional printing apparatus 10, respectively, in the following description. Upper and lower portions of FIG. 3 correspond to the right and left portions of the three-dimensional printing apparatus 10, respectively. The reference signs "F", "Rr", "R", "L", "Up" and "Dn" represent front, rear, right, left, up and down in FIGS. 2, 3 and 4. These definitions are given merely for convenience sake, and do not limit in any way how the three-dimensional printing apparatus 10 may be installed.

Figure 2:
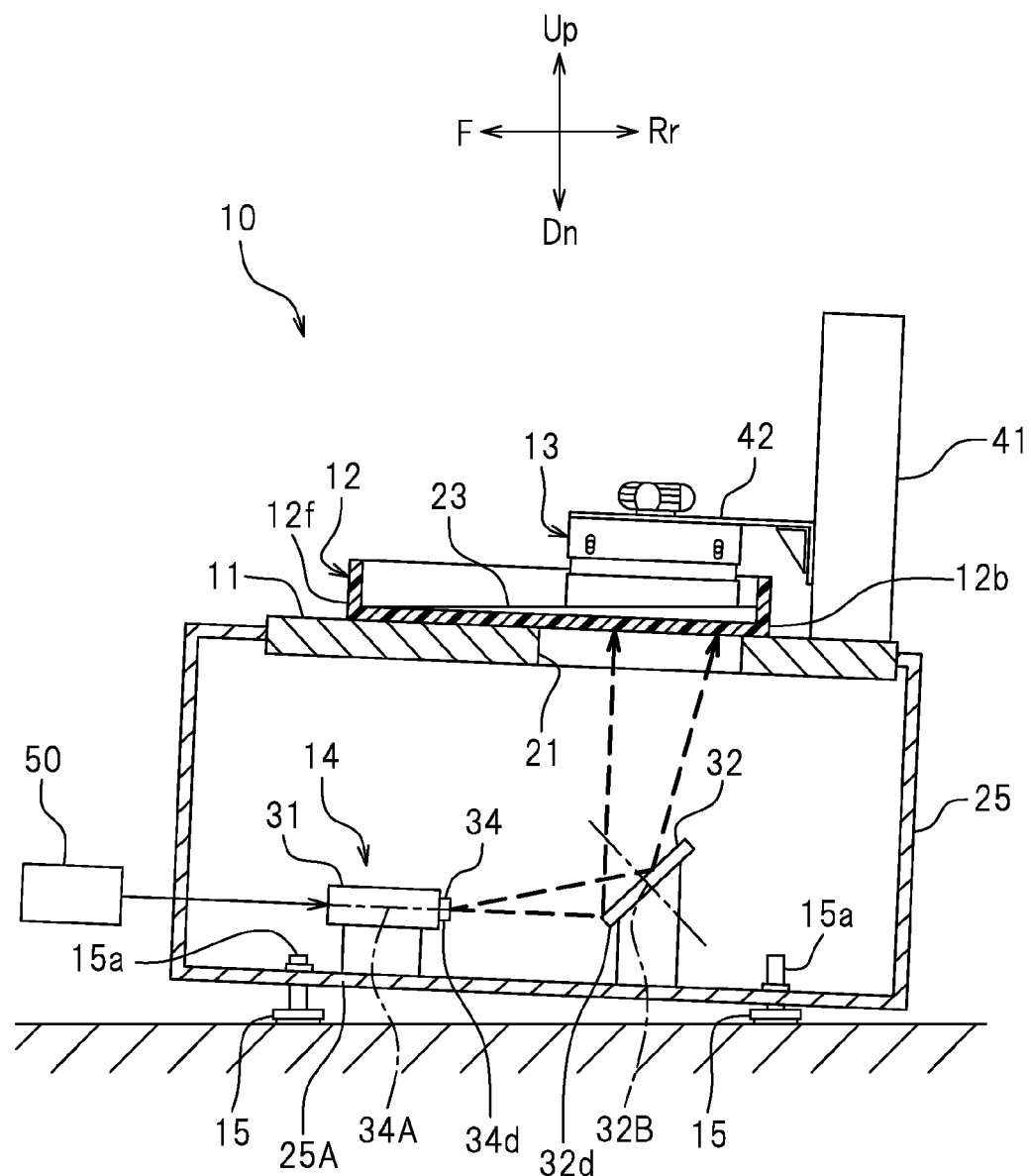
FIG. 2 is a cross-sectional view of a three-dimensional printing apparatus according to a preferred embodiment of the present invention.

As illustrated in FIG. 2, the three-dimensional printing apparatus 10 preferably includes a base 11, a tank 12, a holder 13, an optical device 14, and a case 25.

Figure 3:
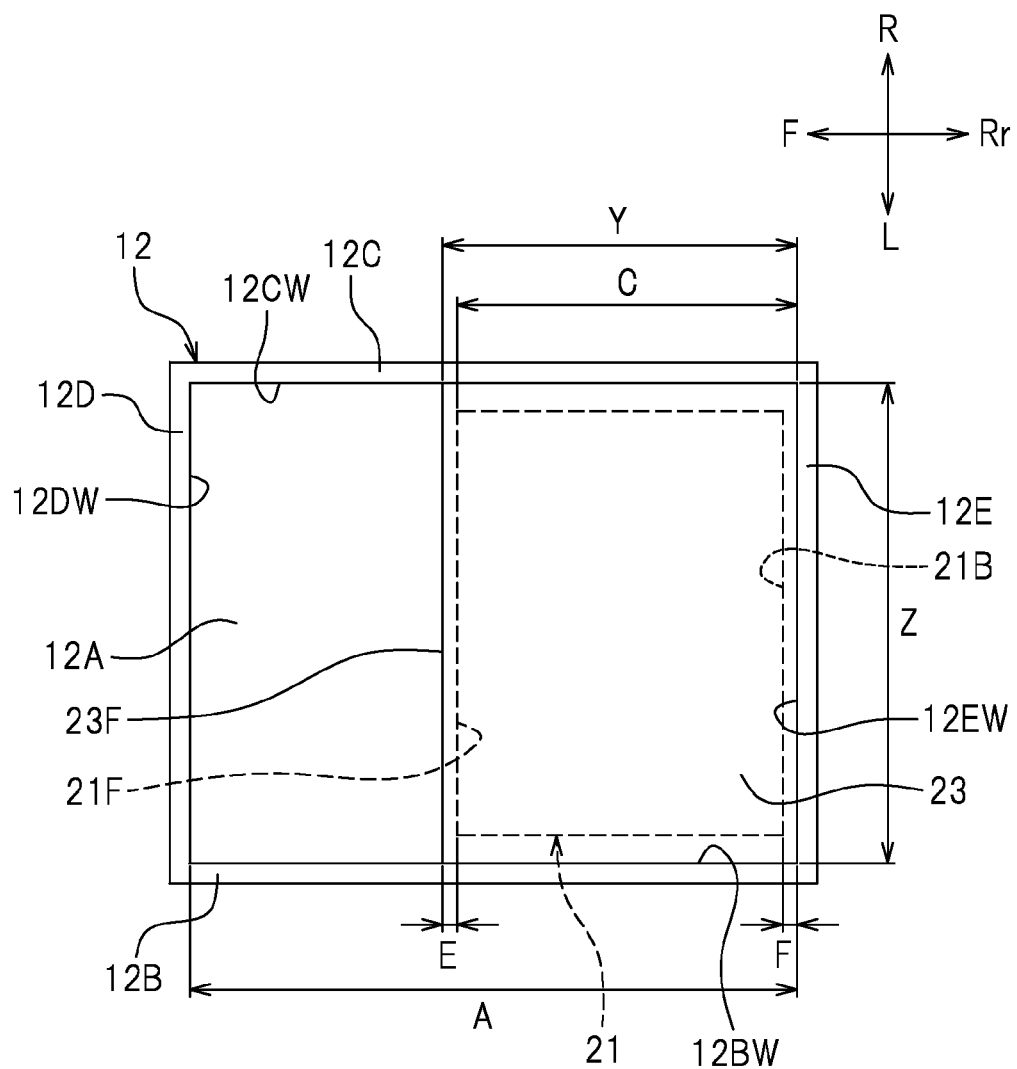
FIG. 3 is a plan view illustrating how a tank is placed on a base in the three-dimensional printing apparatus according to a preferred embodiment of the present invention.

The base 11 is supported by the case 25. The base 11 is provided with an opening 21. The opening 21 defines and serves as a light passage portion through which light to be applied to a photo-curable resin 23 passes. The opening 21 is not limited to any particular shape. As illustrated in FIG. 3, the opening 21 preferably has a rectangular or substantially rectangular shape in a plan view in the present preferred embodiment, for example. The opening 21 is an example of the light passage portion.

Figure 4:
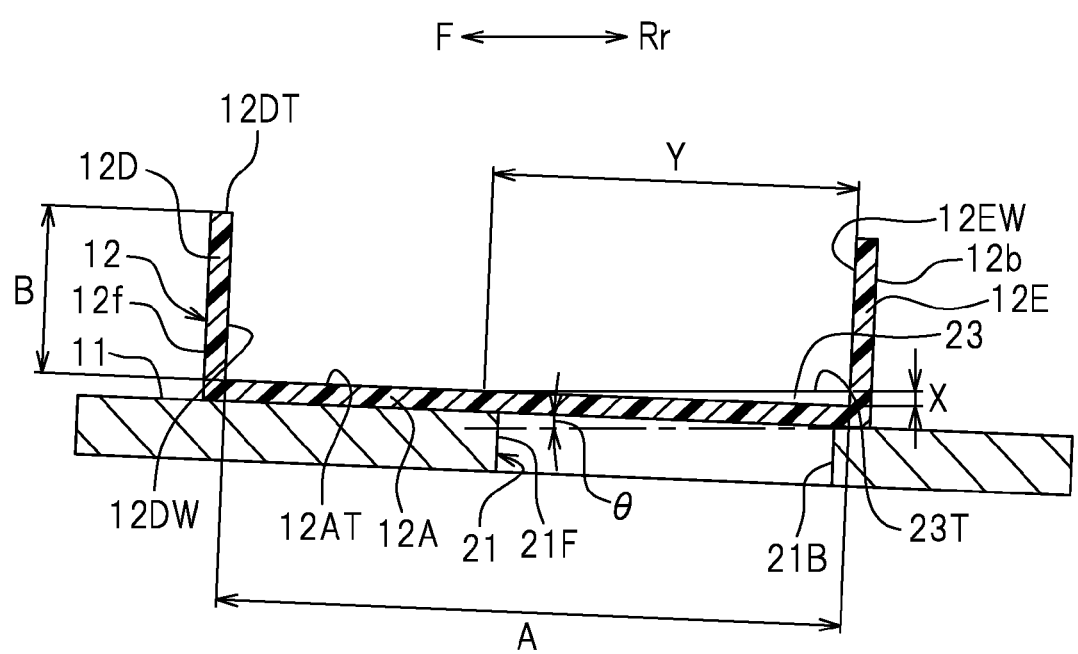
FIG. 4 is a cross-sectional view illustrating how the tank is placed on the base in the three-dimensional printing apparatus according to a preferred embodiment of the present invention.

As illustrated in FIG. 2, the tank 12 is placed on the base 11. The tank 12 is placed on the base 11 so as to be attachable thereto. As illustrated in FIG. 3, the tank 12, which is placed on the base 11 (see FIG. 2), covers the opening 21 of the base 11. The tank 12 overlaps with the opening 21 of the base 11 in the plan view. As illustrated in FIG. 2, the tank 12 stores the photo-curable resin 23 in liquid form. As illustrated in FIG. 3, the tank 12 is a receptacle preferably having a rectangular or substantially rectangular shape in the plan view. The tank 12 preferably includes a bottom wall 12A having a rectangular or substantially rectangular shape in the plan view; a left side wall 12B rising from a left end portion of the bottom wall 12A; a right side wall 12C rising from a right end portion of the bottom wall 12A; a front side wall 12D rising from a front end portion of the bottom wall 12A; and a rear side wall 12E rising from a rear end portion of the bottom wall 12A. When the tank 12 is placed on the base 11, a portion of the bottom wall 12A of the tank 12 is located over the opening 21 of the base 11. In this preferred embodiment, a rear portion of the bottom wall 12A of the tank 12 is located over the opening 21. The opening 21 is located under a bottom surface of a rear portion of the tank 12. At least the bottom wall 12A of the tank 12 is made of a material such as a transparent resin or glass, for example, which allows light to pass therethrough. In the present preferred embodiment, the tank 12 is preferably made of a transparent acrylic resin. A surface of the bottom wall 12A of the tank 12 may be provided with a layer that prevents adhesion of the photo-curable resin 23 to the surface of the bottom wall 12A. This layer may be a silicon layer, for example. As illustrated in FIG. 2, a front end 12f of the tank 12 is located upward relative to a rear end 12b of the tank 12. As illustrated in FIG. 4, the tank 12 tilts at an angle θ with respect to a horizontal plane.

The photo-curable resin 23 is curable by exposure to light.

As illustrated in FIG. 2, the holder 13 is disposed over the tank 12. The holder 13 is disposed over the opening 21 of the base 11. The holder 13 preferably has a rectangular or substantially rectangular shape in the plan view, although the holder 13 is not limited to any particular shape. The holder 13 is raisable and lowerable. The holder 13 lifts, from the tank 12, the photo-curable resin 23 cured by exposure to light emitted from a projector 31 of the optical device 14. When lowered, the holder 13 is immersed in the photo-curable resin 23 stored in the tank 12. When raised, the holder 13 lifts the photo-curable resin 23 cured by exposure to light. In the present preferred embodiment, the base 11 is provided with a support column 41 extending in an up-down direction. A slider 42 is attached to a front portion of the support column 41. The slider 42 is raisable and lowerable along the support column 41. A motor (not illustrated) causes the slider 42 to move upward or downward. Thus, the motor causes the holder 13 to move upward or downward because the holder 13 is attached to the slider 42. The support column 41 indirectly supports the holder 13 via the slider 42 in such a manner that the holder 13 is raisable and lowerable. Alternatively, the support column 41 may directly support the holder 13. The holder 13 is disposed in front of the support column 41. The holder 13 may be movable or immovable in a front-rear direction. The holder 13 may be movable or immovable in a right-left direction.

The optical device 14 is disposed under the base 11. The optical device 14 applies light to the photo-curable resin 23 in liquid form stored in the tank 12. The optical device 14 preferably includes the projector 31 and a mirror 32. The optical device 14 is housed in the case 25 provided under the base 11. The optical device 14 is supported by the case 25.

The projector 31 is an example of a light source that emits light. The light source of the optical device 14 is not limited to the projector 31. In the present preferred embodiment, the projector 31 is disposed under a front portion of the base 11. The projector 31 is disposed forward relative to the holder 13. The projector 31 preferably includes a lens 34. The lens 34 is disposed on a rear portion of the projector 31. The projector 31 emits light from front to rear through the lens 34. The direction in which the projector 31 emits light is not limited to any particular direction. In this preferred embodiment, an amount of the light emitted from the projector 31 to a region above a horizontal plane extending through an optical axis 34A of the lens 34 is larger than an amount of the light emitted from the projector 31 to a region below this horizontal plane. The computer 50 (which will be described below) is connected to the projector 31. The computer 50 controls the light emitted from the projector 31. More specifically, the computer 50 controls, for example, a wavelength band of the light emitted from the projector 31, a shape of the light emitted from the projector 31, and timing of emission of the light from the projector 31.

The mirror 32 reflects the light emitted from the projector 31 toward the tank 12. The mirror 32 is disposed under the opening 21 provided in the base 11. The mirror 32 is disposed behind the projector 31. The mirror 32 is configured to align with the projector 31 in the front-rear direction. In a side view, the optical axis 34A of the lens 34 of the projector 31 is located downward relative to a center 32B of the mirror 32. A lower end 34d of the lens 34 and a lower end 32d of the mirror 32 are located at the same or substantially the same height. A positional difference between the lower end 34d of the lens 34 and the lower end 32d of the mirror 32 in the up-down direction may be smaller than or equal to a length of the projector 31 in the up-down direction, or may be smaller than or equal to a length of the lens 34 in the up-down direction. Alternatively, there may be no positional difference between the lower end 34d of the lens 34 and the lower end 32d of the mirror 32 in the up-down direction. The mirror 32 is disposed to tilt so that its front portion is located lower than its rear portion. The light emitted from the projector 31 is reflected by the mirror 32 and thus applied to the photo-curable resin 23 in the tank 12 through the opening 21 of the base 11. The direction in which the light emitted from the projector 31 is applied may be adjusted by changing the position of the projector 31 in the up-down direction or changing the angle of the mirror 32.

The three-dimensional printing apparatus 10 preferably includes legs 15. The legs 15 define and serve as an example of a tilting device. The legs 15 are configured to tilt the tank 12 so that a front bottom surface of the tank 12 is disposed upward relative to a rear bottom surface of the tank 12. In other words, the legs 15 are configured to tilt the tank 12 so that the tank 12 tilts rearward. The legs 15 are provided on a bottom wall 25A of the case 25. The legs 15 are provided in four corners of the bottom wall 25A of the case 25, which means that the four legs 15 are provided in total. In FIG. 2, the legs 15 provided on left front and left rear portions of the bottom wall 25A of the case 25 are illustrated. Although not illustrated, the similar legs 15 are also provided on right front and right rear portions of the bottom wall 25A of the case 25. Each of the four legs 15 is independently adjustable in length. Each leg 15 preferably includes a shaft 15a inserted through an associated hole (not illustrated) provided in the bottom wall 25A of the case 25. A length of each shaft 15a to be inserted through the bottom wall 25A of the case 25 is adjusted to an appropriate length, thus adjusting the length of each leg 15. The front ones of the four legs 15 are longer than the rear ones of the four legs 15. Thus, the tank 12 tilts rearward. More specifically, the tank 12 tilts obliquely downward and rearward. The adjustment of the length of each leg 15 enables adjustment of the angle θ (see FIG. 4) of the tank 12.

When the tank 12 tilts by the adjustment of the length of each leg 15, the three-dimensional printing apparatus 10 itself also tilts. The base 11, the optical device 14, and the support column 41 are supported by the case 25, which means that when the lengths of the front legs 15 and the lengths of the rear legs 15 differ from each other, the base 11, the optical device 14, and the holder 13, which is attached to the support column 41 via the slider 42, tilt similarly to the tank 12. In this case, relative positional relationships between and among the optical device 14, the opening 21 of the base 11, the tank 12, and the holder 13 remain unchanged. In other words, the positional relationships between and among the components of the three-dimensional printing apparatus 10 remain unchanged. Consequently, tilting the tank 12 does not cause a reduction in quality of a resulting three-dimensional object.

As illustrated in FIG. 1, the three-dimensional printing apparatus 10 is communicably connected to the computer 50. The three-dimensional printing apparatus 10 may be connected to the computer 50 at all times, or may be connected to the computer 50 when necessary. The connection between the three-dimensional printing apparatus 10 and the computer 50 is not limited to a wired connection but may be a wireless connection.

The computer 50 is not limited to any particular type of computer. For example, the computer 50 may be a general-purpose computer. In accordance with the computer program according to the present preferred embodiment, the computer 50 is configured or programmed to calculate a resin amount necessary to print a three-dimensional object using the three-dimensional printing apparatus 10. The computer 50 is provided with a reader 54. The reader 54 reads the computer program from a non-transitory computer-readable storage medium 52 storing the computer program according to the present preferred embodiment. The non-transitory computer-readable storage medium 52 to be used may be a CD-ROM, DVD-ROM, USB flash drive or memory card, for example. The computer program may be stored in an internal memory of the computer 50 in advance. Alternatively, the computer program may be read into the computer 50 via wired or wireless communication.

The computer 50 is preferably operatively connected with a display device 56 including a liquid crystal display, for example; and an input device 58 such as a keyboard and/or a mouse.

Figure 5:
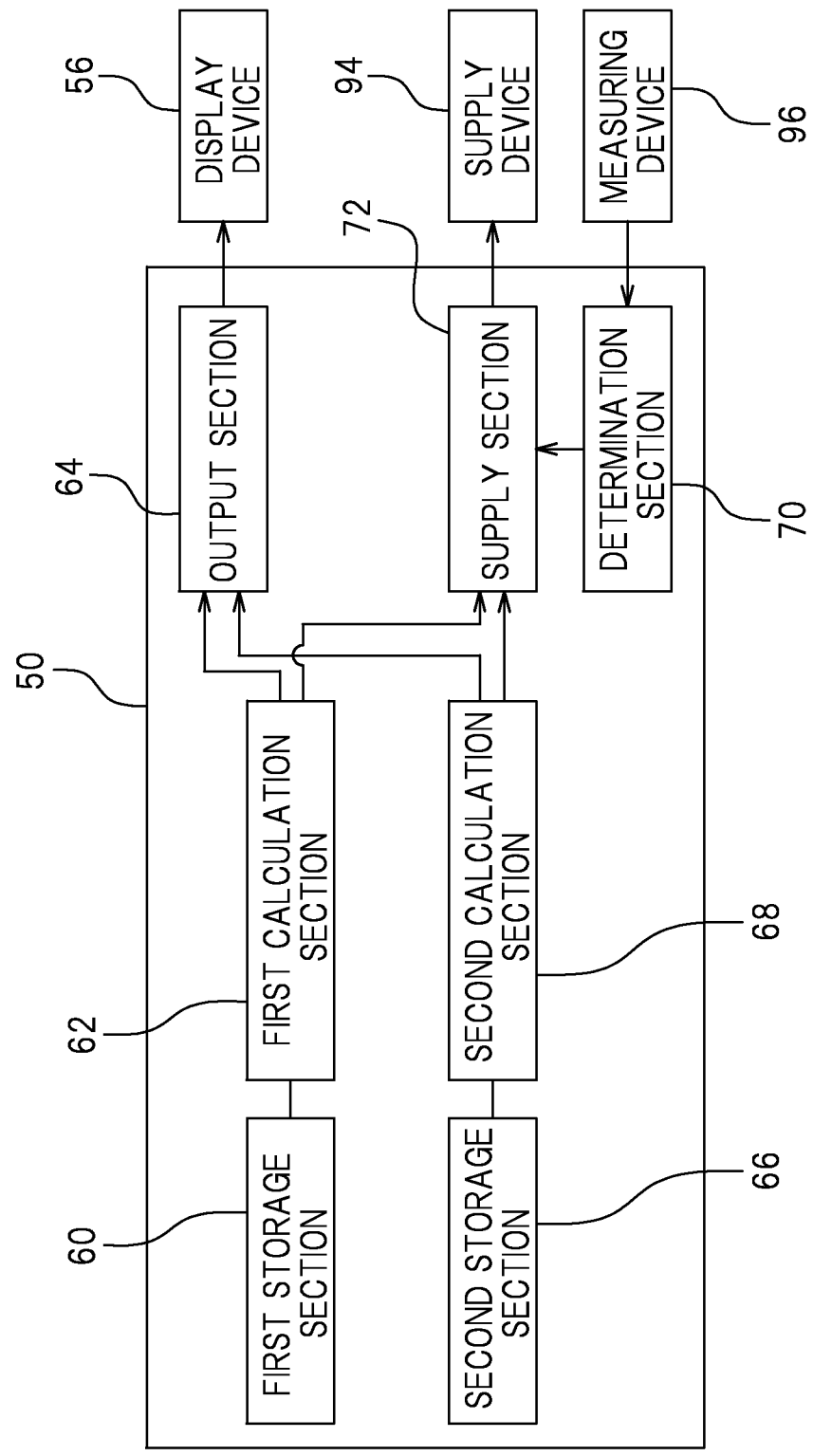
FIG. 5 is a block diagram of a computer according to a preferred embodiment of the present invention.

The computer program according to the present preferred embodiment is intended for a three-dimensional printing apparatus. The computer program according to the present preferred embodiment is used to calculate a resin amount necessary to print a three-dimensional object by curing a photo-curable resin in liquid form and sequentially stacking layers of the cured resin each having a predetermined cross-sectional shape. The computer program according to the present preferred embodiment causes the computer 50 to perform functions described below. FIG. 5 is a functional block diagram of the computer 50. As illustrated in FIG. 5, the computer 50 defines and functions as a first storage section 60. The first storage section 60 stores information of a three-dimensional object to be printed. This information may include a shape of the three-dimensional object. The first storage section 60 further stores information of an auxiliary member that supports the three-dimensional object. This information may include a shape of the auxiliary member. The computer 50 also defines and functions as a first calculation section 62. The first calculation section 62 is configured to calculate a resin amount necessary to print the three-dimensional object based on the information of the three-dimensional object stored in the first storage section 60. The first calculation section 62 is configured to calculate a resin amount necessary to print the auxiliary member based on the information of the auxiliary member stored in the first storage section 60. The first calculation section 62 calculates a first resin amount obtained as the sum of the resin amount necessary to print the three-dimensional object and the resin amount necessary to print the auxiliary member. As used herein, the term "resin amount" refers to an amount of a photo-curable resin in liquid form. The term "auxiliary member" refers to a member that is used to print a three-dimensional object and then removed after completion of the three-dimensional object.

Figure 6:
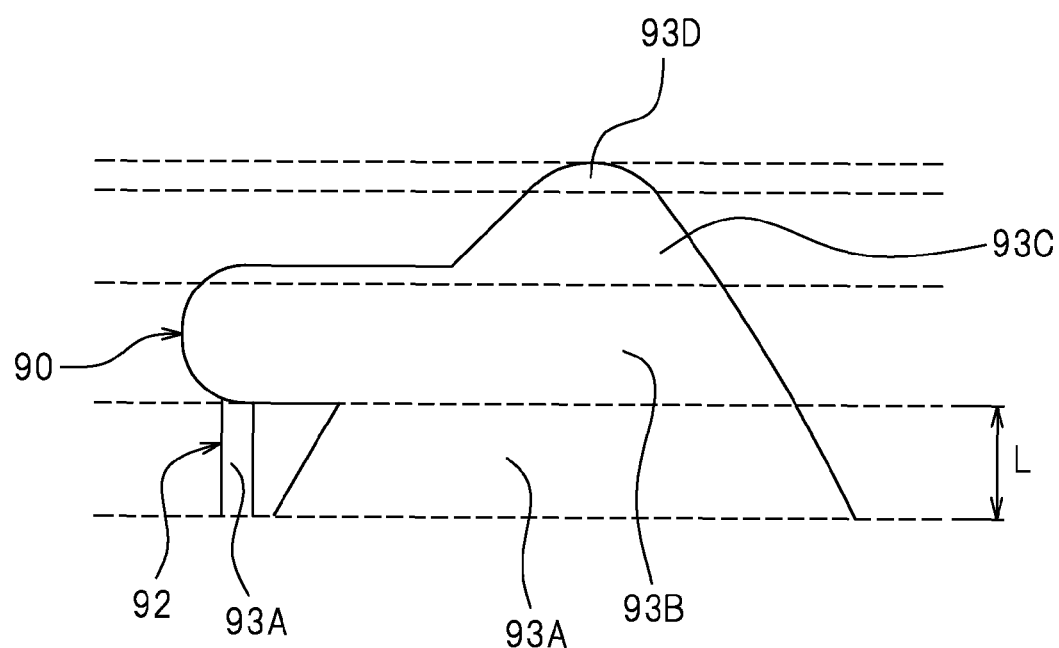
FIG. 6 is a diagram for describing how volumes of a three-dimensional object and an auxiliary member according to a preferred embodiment of the present invention are measured.

In the present preferred embodiment, the first calculation section 62 is configured to calculate the first resin amount as follows. As illustrated in FIG. 6, the first calculation section 62 divides a three-dimensional object 90 and an auxiliary member 92, which are to be printed, into n segments arranged in a direction in which layers of a cured resin are to be stacked. Note that n is an integer. Using Simpson's rule, the first calculation section 62 is configured to calculate a resin amount necessary to print each of the segments. The first calculation section 62 then adds up the calculated resin amounts for the segments, thus obtaining the first resin amount. In the present preferred embodiment, the three-dimensional object 90 and the auxiliary member 92 are preferably divided into four segments 93A to 93D, for example.

In dividing the three-dimensional object 90 and the auxiliary member 92 into a plurality of segments, i.e., the segments 93A to 93D, arranged in the direction in which the layers of the cured resin are to be stacked, lengths L of the segments 93A to 93D in the up-down direction are preferably equal or substantially equal to each other. For example, the length L of each segment preferably ranges from about 0.5 mm to about 5 mm, and more preferably ranges from about 1 mm to about 2 mm, for example. However, the length of the uppermost segment may differ from the lengths of the other segments depending on the shapes of the three-dimensional object 90 and the auxiliary member 92. In the present preferred embodiment, the length of the segment 93D differs from the lengths of the segments 93A to 93C.

The resin amount necessary to print each of the segments 93A to 93D, i.e., a volume V of each of the segments 93A to 93D, is approximated using Simpson's rule (or Simpson's parabolic rule). As Simpson's rule, the following formula (1) is used:

$$V \approx h/3 \times (y_0 + 4y_1 + 2y_2 + \ldots + 4y_{n-1} + y_n) \qquad (1)$$

where h represents the length of each segment in the up-down direction, $y_0$ represents the area of the first layer of each segment, $y_1$ represents the area of the second layer of each segment, $y_2$ represents the area of the third layer of each segment, $y_{n-1}$ represents the area of the nth layer of each segment, and $y_n$ represents the area of the (n+1)th layer of each segment.

The area of each layer of each segment is calculated using an outer product. Specifically, the area of each layer of each segment is a total sum of areas of a plurality of triangles obtained by line segments and origins. In calculating the volume of each of the segments 93A to 93D by using Simpson's rule, i.e., the formula (1), each of the segments 93A to 93D is divided into n layers (the number of which ranges from 1000 to 20000, for example, and preferably is 10000), thus more accurately approximating the volume of each segment.

The first calculation section 62 multiplies the volume of each of the segments 93A to 93D, calculated using Simpson's rule, i.e., the formula (1), by a specific gravity of a photo-curable resin so as to obtain a resin amount necessary for each segment, and adds up the obtained resin amounts. Thus, the first calculation section calculates the first resin amount necessary to print the three-dimensional object 90 and the auxiliary member 92.

As illustrated in FIG. 5, the computer 50 also functions as a second storage section 66. The second storage section 66 stores information of the tank 12 that stores a photo-curable resin. This information may include a shape of the tank 12. The second storage section 66 further stores information of the base 11 on which the tank 12 is placed. The base 11 is provided with the opening 21 through which light to be applied to the photo-curable resin passes. The information of the base 11 may include a shape of the base 11. The computer 50 also functions as a second calculation section 68. Based on the information of the tank 12 and the base 11 stored in the second storage section 66, the second calculation section 68 calculates a second resin amount that is a resin amount remaining in the tank 12 after printing of the three-dimensional object has been finished. In this preferred embodiment, the second resin amount preferably is a resin amount remaining in the tank 12 and necessary to entirely cover the opening 21. As illustrated in FIG. 3, the second resin amount is an amount of the photo-curable resin 23 whose front end 23F is located forward relative to a front end 21F of the opening 21 and rearward relative to an inner wall 12DW of the front side wall 12D of the tank 12 after printing of the three-dimensional object has been finished. As illustrated in FIG. 4, the second resin amount is an amount of the photo-curable resin 23 that remains on a portion of the bottom surface of the tank 12 located over the opening 21 but does not remain on the other portion of the bottom surface of the tank 12 after printing of the three-dimensional object has been finished.

The second storage section 66 further stores information of the tank 12 and the base 11 which will be described below. The second storage section 66 stores a front-rear length A (see FIG. 4) of the tank 12, an up-down length B (see FIG. 4) of the tank 12, and a right-left length Z (see FIG. 3) of the tank 12. As illustrated in FIG. 4, the front-rear length A of the tank 12 is measured from the inner wall 12DW of the front side wall 12D to an inner wall 12EW of the rear side wall 12E. The up-down length B of the tank 12 is measured from an upper surface 12AT of the bottom wall 12A to an upper surface 12DT of the front side wall 12D. As illustrated in FIG. 3, the right-left length Z of the tank 12 is measured from an inner wall 12BW of the left side wall 12B to an inner wall 12CW of the right side wall 12C. The second storage section 66 stores a shape and dimensions of the opening 21 of the base 11. The second storage section 66 stores a location where the opening 21 is under the tank 12 when the tank 12 is placed on the base 11.

In the present preferred embodiment, the second calculation section 68 is configured to calculate the second resin amount as follows. The second calculation section 68 is configured to calculate the second resin amount by multiplying an up-down length X (see FIG. 4) of the photo-curable resin 23 remaining in the tank 12 after printing of the three-dimensional object has been finished; a front-rear length Y (see FIG. 4) of the photo-curable resin 23 remaining in the tank 12 after printing of the three-dimensional object has been finished; and the length Z (see FIG. 3) measured from the inner wall 12BW of the left side wall 12B to the inner wall 12CW of the right side wall 12C. The up-down length X (see FIG. 4) and the front-rear length Y (see FIG. 4) of the photo-curable resin 23 preferably are the lengths necessary to entirely cover the opening 21. As illustrated in FIG. 4, the length X is the length of the longest portion of the photo-curable resin 23 in the up-down direction which is measured from the upper surface 12AT of the bottom wall 12A of the tank 12 to an upper surface 23T of the photo-curable resin 23. In the present preferred embodiment, the length X extends along the rear side wall 12E. The length Y is measured from the inner wall 12EW of the rear side wall 12E of the tank 12 to the front end 23F (see FIG. 3) of the photo-curable resin 23. The length Y, which is necessary to entirely cover the opening 21 in the front-rear direction, is calculated based on the tilting θ of the tank 12 and positional information of the opening 21. As illustrated in FIG. 3, the length Y may be greater than or equal to a length C (see FIG. 3) measured from the inner wall 12EW of the rear side wall 12E to the front end 21F of the opening 21. The length Y is preferably only slightly greater than the length C because the amount of the photo-curable resin 23 stored in the tank 12 after printing of the three-dimensional object has been finished is ideally kept as small as possible. A distance E between the front end 21F of the opening 21 and the front end 23F of the photo-curable resin 23 is preferably smaller than or equal to a distance F between the inner wall 12EW of the rear side wall 12E and a rear end 21B of the opening 21.

As illustrated in FIG. 5, the computer 50 also defines and functions as an output section 64. The output section 64 is configured to output the first resin amount that is the sum of the resin amounts calculated by the first calculation section 62, one of which is necessary to print the three-dimensional object and the other of which is necessary to print the auxiliary member. The output section 64 further outputs a third resin amount that is the sum of the first and second resin amounts. The display device 56 displays the first resin amount or the third resin amount output from the output section 64.

The computer 50 also defines and functions as a determination section 70. The determination section 70 determines whether the amount of the resin stored in the tank 12 and measured by the measuring device 96 is a predetermined amount.

The computer 50 also defines and functions as a supply section 72. The supply section 72 instructs the supply device 94 to supply, into the tank 12, the resin by the first resin amount calculated by the first calculation section 62. The supply section 72 instructs the supply device 94 to supply, into the tank 12, the resin by the third resin amount, which is the sum of the first resin amount calculated by the first calculation section 62 and the second resin amount calculated by the second calculation section 68.

As illustrated in FIG. 1, the measuring device 96 is connected to the computer 50. The measuring device 96 measures the amount of the resin in the tank 12 (see FIG. 2). The measuring device 96 is disposed inside the tank 12 of the three-dimensional printing apparatus 10. The measuring device 96 is not limited to any particular type of measuring device. For example, a known sensor, such as a liquid level sensor, may be suitably used as the measuring device 96.

As illustrated in FIG. 1, the supply device 94 is connected to the computer 50. The supply device 94 is provided in the three-dimensional printing apparatus 10. The supply device 94 automatically supplies the liquid photo-curable resin to the tank (see FIG. 2). Alternatively, a user may directly supply the photo-curable resin to the tank 12. As illustrated in FIG. 5, the supply device 94 automatically supplies the liquid photo-curable resin to the tank 12 by the first resin amount or the third resin amount in accordance with an instruction provided from the supply section 72. Upon determination by the determination section 70 that the amount of the resin in the tank 12 is greater than the predetermined amount after printing of the three-dimensional object has been finished, the determination section 70 notifies the supply section 72 of this determination. In response to this notification, the supply section 72 instructs the supply device 94 to reduce the amount of the photo-curable resin to be supplied to the tank 12. Upon determination by the determination section 70 that the amount of the resin in the tank 12 is smaller than the predetermined amount while the three-dimensional object is being printed, the determination section 70 notifies the supply section 72 of this determination. In response to this notification, the supply section 72 instructs the supply device 94 to supply the photo-curable resin to the tank 12 so as to make up the deficiency of the photo-curable resin in the tank 12.

Figure 7:
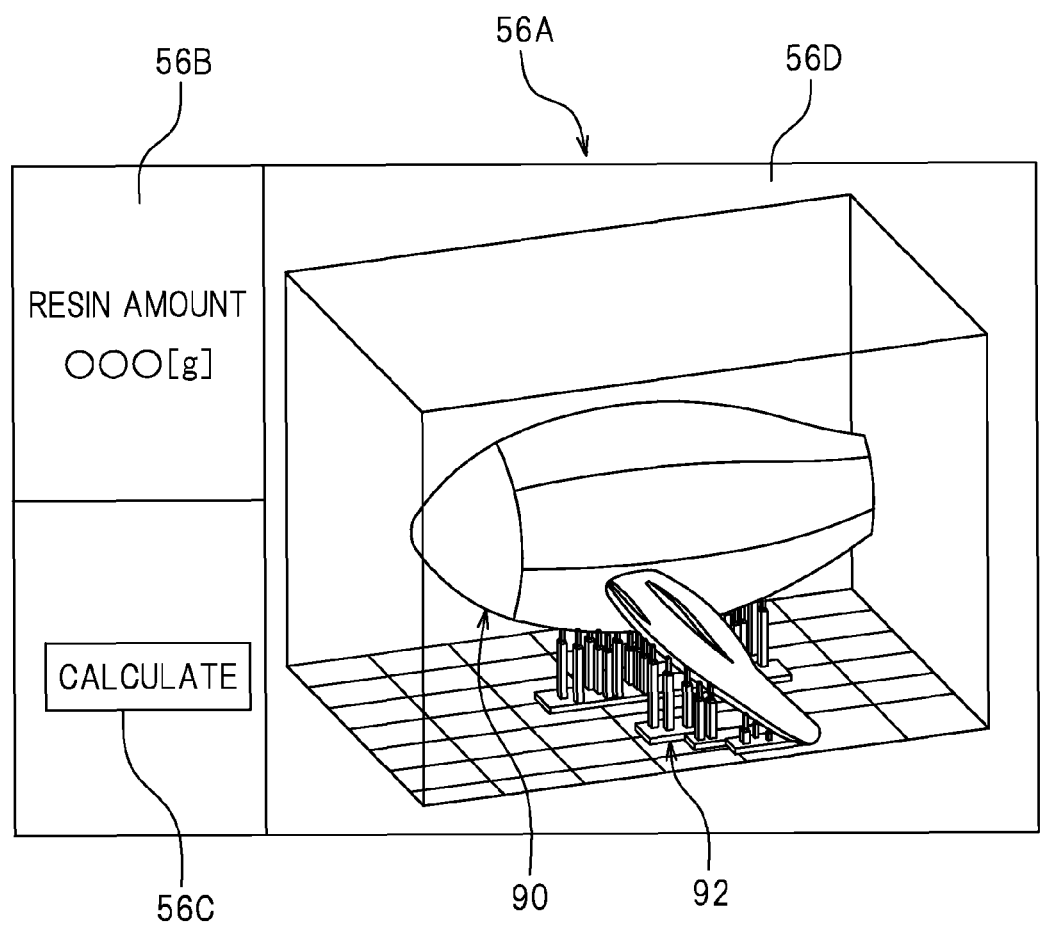
FIG. 7 is a diagram illustrating a main screen according to a preferred embodiment of the present invention.

FIG. 7 illustrates a main screen 56A presented on the display device 56 (see FIG. 1) during execution of the computer program according to the present preferred embodiment. The main screen 56A preferably includes a region 56B that displays a resin amount necessary to print a three-dimensional object; a button 56C on which a user clicks to calculate the necessary resin amount; and a region 56D that displays the three-dimensional object 90 and the auxiliary member 92. The region 56B displays the third resin amount, which is the sum of the first resin amount calculated by the first calculation section 62 (see FIG. 5) and the second resin amount calculated by the second calculation section 68 (see FIG. 5). Alternatively, the region 56B may display only the first resin amount calculated by the first calculation section 62. The region 56D displays the information of the three-dimensional object 90 and the auxiliary member 92 stored in the first storage section 60.

Upon clicking on the button 56C by the user, the first calculation section 62 (see FIG. 5) calculates the first resin amount necessary to print the three-dimensional object 90 and the auxiliary member 92 displayed on the region 56D. The second calculation section 68 (see FIG. 5) calculates the second resin amount necessary to entirely cover the opening 21 of the base 11 after the three-dimensional object 90 and auxiliary member 92 are printed. Subsequently, the region 56B displays the third resin amount, which is the sum of the first and second resin amounts. Upon clicking on the button 56C by the user, the region 56B may display only the first resin amount calculated by the first calculation section 62.

How the three-dimensional printing apparatus 10 according to the present preferred embodiment prints a three-dimensional object will be described below on the assumption that the resin is supplied into the tank 12 by the third resin amount, which is the sum of the first and second resin amounts. First, upon clicking on the button 56C (see FIG. 7) by the user, the first calculation section 62 (see FIG. 5) calculates the first resin amount, and the second calculation section 68 (see FIG. 5) calculates the second resin amount. Subsequently, the output section 64 (see FIG. 5) outputs the third resin amount, which is the sum of the first and second resin amounts, and the region 56B of the main screen 56A displays the third resin amount. The supply device 94 (see FIG. 5) automatically supplies the liquid photo-curable resin into the tank 12 (see FIG. 2) by the third resin amount in response to an instruction from the supply section 72 (see FIG. 5). Alternatively, the user may manually supply the liquid photo-curable resin into the tank 12 by the third resin amount.

Next, as illustrated in FIG. 2, the computer 50 causes the projector 31 to emit light through its lens 34. The light emitted from the projector 31 is reflected by the mirror 32. The light reflected by the mirror 32 passes through the opening 21 of the base 11. The light, which has passed through the opening 21, then passes through the bottom wall 12A of the tank 12. The light, which has passed through the bottom wall 12A of the tank 12, is then applied to the photo-curable resin 23 stored in the tank 12 and located between the bottom wall 12A and the holder 13. The photo-curable resin 23, which has been exposed to the light, is cured. The angle of the mirror 32 is adjusted to a suitable angle so as to appropriately change the position at which the photo-curable resin 23 is to be exposed to the light, and thus the cured photo-curable resin 23 forms a solid resin layer having a desired cross-sectional shape.

After the formation of the layer, the motor (not illustrated), which can raise and lower the holder 13, is driven to move the holder 13 upward. With this movement, the solid resin layer held by the holder 13 is lifted, providing a gap between the resin layer and the tank 12. The photo-curable resin 23 in liquid form flows into this gap. Then, the photo-curable resin 23 inside the gap is exposed to the light from the projector 31, thus forming a next solid resin layer having a desired cross-sectional shape. Thereafter, operations similar to those described above are repeated to print the three-dimensional object 90 (see FIG. 7) and the auxiliary member 92 (see FIG. 7) each having a desired three-dimensional shape. Upon determination by the determination section 70 (see FIG. 5) that the photo-curable resin in the tank 12 is deficient while the three-dimensional object 90 and the auxiliary member 92 are being printed, the supply device 94 automatically supplies the photo-curable resin into the tank 12 to make up the deficiency of the photo-curable resin in the tank 12. Upon determination by the determination section 70 that the amount of the resin in the tank 12 is greater than the predetermined amount after the three-dimensional object 90 and the auxiliary member 92 are printed, the supply device 94 reduces the amount of the photo-curable resin to be supplied to the tank 12, in preparation for printing the next three-dimensional object 90.

Although preferred embodiments of the present invention have been described thus far, the preferred embodiments described above are only illustrative, and the present invention may be embodied in various other forms.

The first storage section 60 preferably is configured to store information of a three-dimensional object and information of an auxiliary member in the above preferred embodiments. However, when no auxiliary member is needed to print the three-dimensional object, the first storage section 60 preferably is configured to store only the information of the three-dimensional object.

The first calculation section 62 preferably is configured to calculate a resin amount necessary to print a three-dimensional object and a resin amount necessary to print an auxiliary member in the above preferred embodiments. However, when no auxiliary member is needed to print the three-dimensional object, the first calculation section 62 preferably is configured to calculate only the resin amount necessary to print the three-dimensional object.

The first calculation section 62 preferably is configured to calculate at one time a resin amount necessary to print an entire three-dimensional object and a resin amount necessary to print an entire auxiliary member in the above preferred embodiments. Alternatively, the first calculation section 62 may calculate a resin amount necessary to print each solid resin layer including the three-dimensional object and auxiliary member in a desired cross-sectional shape and add up the resin required for all such layers.

The terms and expressions herein are used as terms of description and not of limitation, and there is no intention that in the use of such terms and expressions of excluding any equivalents of the features shown and described or portions thereof, but it is recognized that various modifications are possible within the scope of the present invention claimed. While the present invention may be embodied in many different forms, a number of illustrative preferred embodiments are described herein with the understanding that the present disclosure is to be considered as providing examples of the principles of the present invention and that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art based on the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing system that prints a three-dimensional object by curing a liquid photo-curable resin and sequentially stacking layers of the cured resin each having a predetermined cross-sectional shape, the system comprising:
    a first storage section configured to store information of a three-dimensional object to be printed, and information of an auxiliary member that supports the three-dimensional object;
    a first calculation section configured to calculate a resin amount necessary to print the three-dimensional object and a resin amount necessary to print the auxiliary member, the first calculation section being configured to calculate the resin amounts based on the information of the three-dimensional object and the auxiliary member stored in the first storage section;
    an output section configured to output a first resin amount that is a sum of the calculated resin amount necessary to print the three-dimensional object and the calculated resin amount necessary to print the auxiliary member;
    a three-dimensional printing apparatus including:
        a tank storing the liquid photo-curable resin;
        a base on which the tank is located, the base including a light passage portion through which light to be applied to the photo-curable resin passes;
        an optical device disposed under the base and including at least a light source that emits light, the optical device being configured to apply the light, emitted from the light source, to the photo-curable resin in the tank through the light passage portion; and
        a holder provided over the tank so as to be raisable and lowerable, the holder being configured so that when lowered, the holder is immersed in the photo-curable resin in the tank, and when raised, the holder lifts the photo-curable resin cured by exposure to the light;
    a supply device configured to supply the liquid photo-curable resin to the tank; and
    a supply section configured to instruct the supply device to supply, into the tank, a resin by the first resin amount calculated by the first calculation section; wherein
    the supply device is configured to automatically supply the first resin amount of the photo-curable resin to the tank.

2. The three-dimensional printing system according to claim 1, wherein the first calculation section is configured to divide the three-dimensional object and the auxiliary member, which are to be printed, into a plurality of segments arranged in a direction in which the layers of the cured resin are to be stacked, calculate a resin amount necessary for each of the segments by using Simpson's rule, and add up the calculated resin amounts necessary for the segments, thus obtaining the first resin amount.

3. The three-dimensional printing system according to claim 1, further comprising:
    a second storage section configured to store information of the tank and information of the base; and
    a second calculation section configured to calculate a second resin amount that is a resin amount remaining in the tank after printing of the three-dimensional object has been finished, the second calculation section being configured to calculate the second resin amount based on the information of the tank and the base stored in the second storage section; wherein
    the output section is configured to output a third resin amount that is a sum of the first and second resin amounts;
    the supply section is configured to instruct the supply device to supply, into the tank, a resin by the third resin amount; and
    the supply device is configured to automatically supply the third resin amount of the photo-curable resin to the tank.

4. The three-dimensional printing system according to claim 3, wherein the second resin amount is a resin amount remaining in the tank and necessary to entirely cover the light passage portion.

5. The three-dimensional printing system according to claim 3, wherein assuming that a predetermined direction of the tank is defined as a front-rear direction, the light passage portion is located under a bottom surface of a rear portion of the tank, and a front end of the tank is located upward relative to a rear end of the tank.

6. The three-dimensional printing system according to claim 5, wherein the second resin amount is an amount of the photo-curable resin that remains on a portion of the bottom surface of the tank located over the light passage portion but does not remain on the other portion of the bottom surface of the tank after printing of the three-dimensional object has been finished.

7. The three-dimensional printing system according to claim 3, further comprising a display device configured to display the first resin amount or the third resin amount output from the output section.

8. The three-dimensional printing system according to claim 1, further comprising:
a measuring device configured to measure an amount of the resin in the tank; and
a determination section configured to determine whether the amount of the resin in the tank, measured by the measuring device, is a predetermined amount; wherein
upon determination by the determination section that the amount of the resin in the tank is greater than the predetermined amount after printing of the three-dimensional object has been finished, the supply device reduces the amount of the photo-curable resin to be supplied to the tank.

9. A non-transitory computer-readable storage medium storing a computer program for use with a three-dimensional printing apparatus including a tank storing a liquid photo-curable resin and a supply device configured to automatically supply the liquid photo-curable resin to the tank and used to calculate a resin amount necessary to print a three-dimensional object by curing the liquid photo-curable resin and sequentially stacking layers of the cured resin each having a predetermined cross-sectional shape, the computer program causing a computer to perform the steps of:
storing, by a first storage section, information of a three-dimensional object to be printed, and information of an auxiliary member that supports the three-dimensional object;
calculating, by a first calculation section, a resin amount necessary to print the three-dimensional object and a resin amount necessary to print the auxiliary member, the resin amounts being calculated based on the information of the three-dimensional object and the auxiliary member stored in the first storage section;
outputting, by an output section, a first resin amount that is a sum of the calculated resin amount necessary to print the three-dimensional object and the calculated resin amount necessary to print the auxiliary member;
instructing, by a supply section, the supply device to supply, into the tank, a resin by the first resin amount calculated by the first calculation section; and
controlling the supply device to supply to the tank the first resin amount calculated in the step of calculating.

10. The non-transitory computer-readable storage medium according to claim 9, wherein the computer program further causes the computer to perform the steps of:
dividing, by the first calculation section, the three-dimensional object and the auxiliary member, which are to be printed, into a plurality of segments arranged in a direction in which the layers of the cured resin are to be stacked, calculating a resin amount necessary for each of the segments by using Simpson's rule, and adding up the calculated resin amounts necessary for the segments, thus obtaining the first resin amount.

11. The non-transitory computer-readable storage medium according to claim 9, wherein the computer program further causes the computer to perform the steps of:
storing, by a second storage section, information of a tank that stores the photo-curable resin, and information of a base on which the tank is placed, the base including a light passage portion through which light to be applied to the photo-curable resin passes; and
calculating, by a second calculation section, a second resin amount that is a resin amount remaining in the tank after printing of the three-dimensional object has been finished, the second resin amount being calculated based on the information of the tank and the base stored in the second storage section;
outputting, by the output section, a third resin amount that is a sum of the first and second resin amounts;
instructing, by the supply section, the supply device to supply, into the tank, a resin by the third resin amount; and
controlling the supply device to supply to the tank the third resin amount calculated in the step of calculating.

12. The non-transitory computer-readable storage medium according to claim 11, wherein the second resin amount is a resin amount remaining in the tank and necessary to entirely cover the light passage portion.

* * * * *